Aug. 13, 1968     C. F. FUNK     3,396,776
METHOD OF CLADDING METAL
Filed Oct. 20, 1965
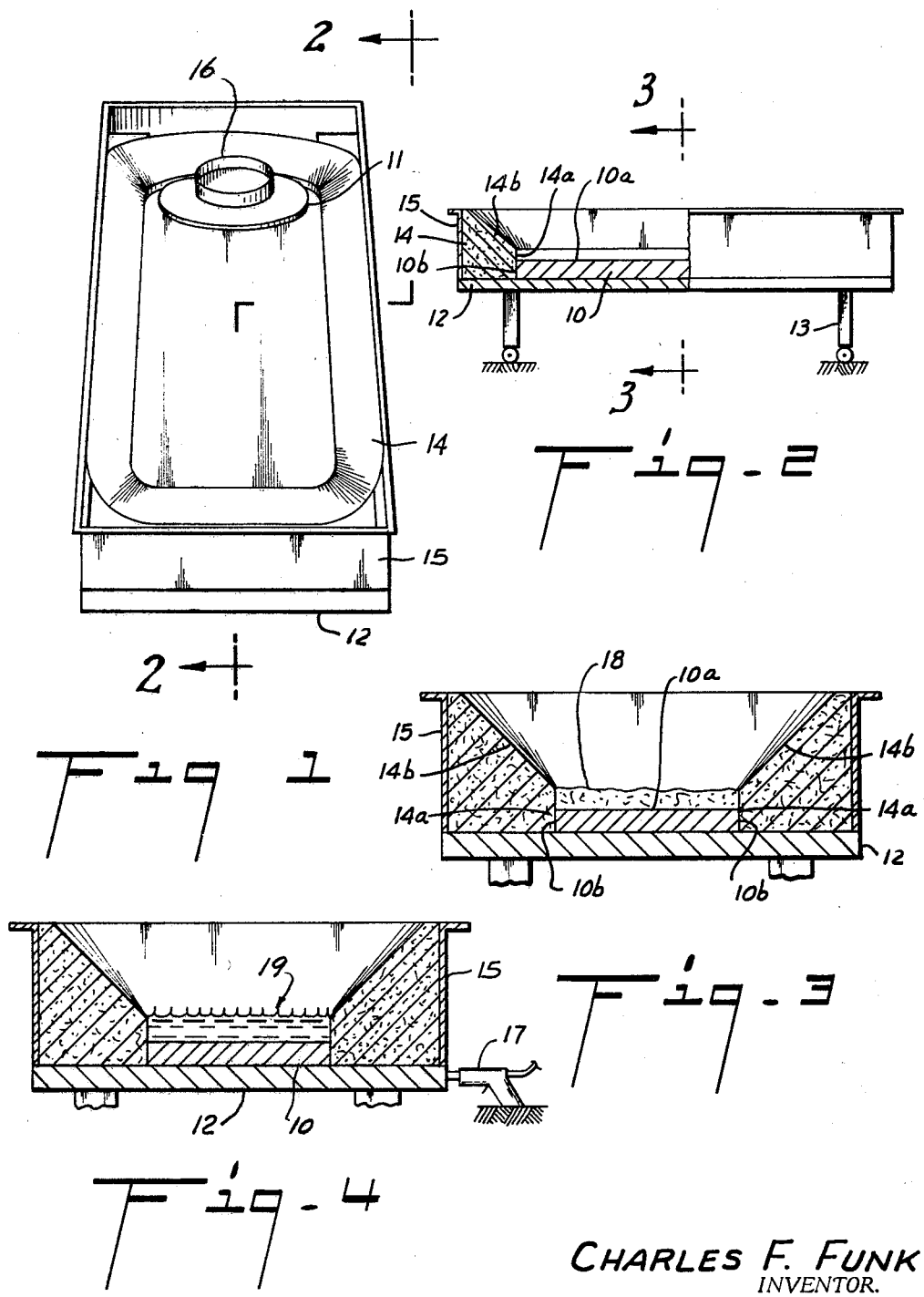
CHARLES F. FUNK
INVENTOR.
BY
ATTORNEYS

United States Patent Office 3,396,776
Patented Aug. 13, 1968

3,396,776
METHOD OF CLADDING METAL
Charles F. Funk, Houston, Tex., assignor of twenty-five percent to Jennings B. Thompson, Houston, Tex.
Filed Oct. 20, 1965, Ser. No. 498,360
7 Claims. (Cl. 164—54)

ABSTRACT OF THE DISCLOSURE

The surface of a metal body is clad with additional metal by the following method. The surface to be clad is surrounded by a mold of the desired shape. A mixture of iron oxide and aluminum is placed in the mold against the surface and a reduction of the iron oxide by the aluminum is started by applying heat to the mixture. The iron oxide is reduced to iron, the aluminum is oxidized and sufficient heat is produced by the reaction to melt the iron and raise it to a superheated temperature. The molten metal in the mold is then vibrated to produce sufficient turbulence to cause a constant replacing of the molten metal adjacent the surface being clad. This insures that the molten iron produced by the reaction will remain in a liquid state the maximum possible length of time thereby increasing the zone of fusion between the clad metal and the metal body, when the clad metal is allowed to solidify. This method also produces a more uniform zone of fusion between the clad metal and the metal body being clad.

---

This invention relates to an improved method of cladding the surface of a metal body and more particularly to an improved metal cladding method that employs aluminothermic welding.

Aluminothermic welding employing Thermit, a mixture of finely divided aluminum and iron oxide, has been used for many years to weld together the ends of railroad rails, re-enforcing bars, etc.

It is an object of this invention to provide an improved method of cladding a metal surface using aluminothermic material to provide the metal to clad the surface.

It is another object of this invention to provide a method of cladding a surface of a metal body with a layer of clad metal that is free of slag inclusions, shrink holes, and gas pockets.

It is another object of this invention to provide a method of cladding a surface of a steel body wherein the metal to clad the surface is produced by aluminothermic material reacted in place on the surface to be clad.

It is yet another object of this invention to provide a method of cladding a surface of a steel body with a layer of additional steel, said method providing complete fusion between the added steel and the parent steel.

These and other objects, advantages and features of the invention will be apparent to those skilled in the art from a consideration of this specification and attached drawings.

The objects set out above are obtained in accordance with this invention by introducing in the cladding process an additional step not heretofore employed. It has been discovered that by vibrating the cladding metal, during at least a portion of the time that it is in the molten state against the surface of the parent metal or body to which it is to be fused, a remarkable improvement in the fusion between the cladding metal and the parent metal is produced. The length of time the molten metal is vibrated depends upon the thickness of the clad metal, the volume thereof, and the amount of preheat, etc., in the parent metal. Preferably, the vibrations are not started until the exothermic reaction is substantially complete and they are stopped before the metal begins to solidify.

This invention has been employed to clad a steel gate from a 36 inch gate valve employed in a pipeline. The gate consisted of a metal slab approximately 8 feet long and 4 feet wide. Each side of the gate was clad with a layer of steel about one inch thick.

The invention will now be described in detail in connection with the cladding of this gate as shown in the attached drawings in which, FIGURE 1 is an isometric view of the gate located in a mold preparatory to having one side clad with an additional layer of steel, the view shows the top and one side of the mold;

FIGURE 2 is a partial vertical section and partial side elevation view of the mold of FIGURE 1, the section is taken along line 2—2 of FIGURE 1;

FIGURE 3 is a vertical sectional view along line 3—3 of FIGURE 2 with the aluminothermic material in place on the gate before the reaction is started; and FIGURE 4 illustrates the molten metal and slag in the mold being vibrated.

The valve gate 10, which has an opening 11 adjacent one end to provide the opening for the valve, was originally about five inches thick. The side surfaces of the gate became scored and galled in service. To remove the marred portion and to provide for the metal to be fused to the gate, each side was machined to remove about five-eighths of an inch of metal. Using the cladding method of this invention, a layer of metal about one inch thick was then fused to each side of the gate and the gate remachined back to its original thickness. This left about five-eighths of an inch of clad metal on each side of the gate.

To clad each surface, the gate was placed on table 12 provided with support legs 13 with one side surface 10a facing up. Sand mold 14 then was built up around the surface using a good quality molding sand. The mold has vertical sides 14a adjacent edge surface 10b of the gate that extends upwardly above surface 10a of the gate a distance equal to or slightly greater than the thickness of metal to be fused to the gate, which in this case was one inch. Walls 14b of the mold then taper upwardly and outwardly therefrom to form a funnel shaped opening around the top of the mold. The sand was retained in place around the gate by metal mold box 15. The sand was formed in the same manner inside opening 11 as shown in FIGURE 1. A metal cylinder 16 was used to reduce the amount of sand required and to support the sand in place.

The gate and mold was then preheated to a temperature of about 950° F. The amount of preheat used will depend on the size of the body being clad. If it is relatively small as compared to the volume of metal to be added, little or no preheat is required. Where the body is large, such as gate 10, then it should be preheated to keep it from cooling the molten clad metal before it can heat a substantial thickness of the body adjacent the surface being clad to fusion temperature.

The mold was then filled with an aluminothermic mixture 18 of aluminum and iron oxide, plus the ingredients desired to produce a steel of the desired type. In this particular case, the surface after being clad was to have a Brinell hardness of from 160 to 180 with good wear resistant qualities.

FIGURE 3 shows the mixture of aluminum and metal oxide and other ingredients in place in the mold directly in contact with the surface to be clad. The volume of material used, of course, determines the thickness of the clad metal, as a rule of thumb, a 50 percent yield by weight can be expected.

The next step in the process is to start the reaction between the aluminum and iron oxide. The reaction reduces the iron oxide and forms aluminum oxide. This reaction is exothermic producing sufficient heat to superheat the iron to a temperature considerably above its melting point. At this point in the process, while the material is molten, vibrations are induced in the molten metal. When cladding the valve gates, the molten metal was vibrated by air hammer 17. The hammer was held so it would strike table 12 as shown in FIGURE 4, which, of course, would produce vibrations in the body being clad, gate 10 and molten pool 19 of clad metal on its upper surface. The molten metal was vibrated for a period of approximately one minute. At this time, the molten metal was beginning to solidify and the cladding process was complete. After removing the gate from the mold the slag, aluminum oxide, could easily be removed from the surface of the clad metal with a hammer. The gate was then turned over and using the same method, another layer of metal approximately one inch thick, was fused to that side of the gate. The gate was then ready to be machined back to its original dimensions.

It is believed that by vibrating the molten metal while it is in place on the surface being clad, the molten metal will melt, wash away, and intermix with a substantial portion of the parent metal adjacent the surface. Whatever the reason, the cladding method just described produced complete fusion between the two bodies of metal. Also, the layer of clad metal produced was free of gas pockets and shrink holes.

The vibrations can be continued until the molten metal has solidified. Its surface, however, will probably have ripples in it. The frequency of the vibrations should be such that they will not tend to destroy the mold or cause the metal to bounce or splash out of the mold. In the process described above, the air hammer was provided with sufficient air to cause the surface of the molten material to jump up in peaks an inch or two high, as shown in FIGURE 4. The air required to do this, or the setting of any other vibrator used, can be predetermined by placing a vessel of water on the surface being clad and adjusting the vibrator to produce the desired turbulence in the water.

From the foregoing, it will be seen that this invention is one well adapted to attain all of the ends and objects hereinabove set forth, together with other advantages which are obvious and which are inherent to the process and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of cladding a surface of a metal body, comprising, the steps of surrounding the surface to be clad with a mold of the desired shape, placing a mixture of iron oxide and aluminum in the mold against the surface, starting an exothermic reaction in the mixture to produce superheated iron and aluminum oxide, vibrating the molten metal, stopping the vibrations before the metal begins to solidify, and fusing the metal to the metal body by allowing the metal to solidify.

2. The method of claim 1 in which the molten metal is vibrated by vibrating the body being clad.

3. A method of cladding a surface of a body of metal with a layer of metal comprising the steps of covering the surface to be clad with a layer of molten cladding metal superheated to a temperature substantially above its melting point and that of the metal of the body being clad, vibrating the molten cladding metal to cause the molten metal to wash the surface being clad, and fusing the cladding metal to the body by allowing the cladding metal to solidify.

4. A method of cladding a surface of a metal body with a layer of clad metal, comprising the steps of surrounding the surface of the metal body to be clad with a mold, filling the mold with molten cladding metal having a temperature substantially above the melting temperature of the metal to be clad, vibrating the molten cladding metal to create sufficient turbulence therein to cause the molten cladding metal adjacent the surface being clad to be constantly replaced before it can give up enough heat to the body being clad to cause it to solidify so it will melt and intermix with a substantial layer of the metal adjacent the surface of the body being clad, maintaining the turbulence in the molten cladding metal until the temperature of the molten metal approaches the melting point thereof, stopping the vibration of the molten cladding metal to allow it to become quiescent before solidifying and fusing the cladding metal to the body being clad by allowing the cladding metal and the metal of the body melted by the cladding metal to solidify.

5. A method of cladding a surface of a body of steel with a layer of steel comprising the steps of placing a mold around the outer periphery of the surface to be clad, covering the surface within the mold with a layer of aluminothermic material to a depth sufficient to provide a layer of metal of the desired thickness, initiating the reaction of the aluminothermic material, vibrating the molten metal produced by the reaction and fusing the metal produced by the reaction of the aluminothermic material to the surface being clad by allowing the metal to solidify.

6. The method of claim 5 in which the molten metal is vibrated by vibrating the body being clad.

7. The method of claim 5 further provided with the step of preheating the body to a temperature of from 600°–1000° F. before initiating the exothermic reaction between the oxide and the aluminum.

References Cited

UNITED STATES PATENTS

| 3,091,825 | 6/1963 | Deppeler et al. | 164—54 |
| 3,161,928 | 12/1964 | Bishop et al. | 164—54 |
| 3,165,983 | 1/1965 | Thomas | 92—169 |

FOREIGN PATENTS

| 644,189 | 7/1962 | Canada. |

OTHER REFERENCES

Ultrasonic Vibrations Refine Grain Size, by D. H. Lane, J. W. Cunningham and W. A. Tiller, Metal Progress, September 1959, pp. 108–110.

J. SPENCER OVERHOLSER, *Primary Examiner.*

V. K. RISING, *Assistant Examiner.*